(12) United States Patent
Osher et al.

(10) Patent No.: US 10,182,556 B1
(45) Date of Patent: Jan. 22, 2019

(54) LIGHTED NON-RETRACTABLE ANIMAL RESTRAINT WITH ADDITIONAL LIGHTING FEATURE

(71) Applicants: John D. Osher, Ft. Lauderdale, FL (US); Joseph Hassan, Singer Island, FL (US)

(72) Inventors: John D. Osher, Ft. Lauderdale, FL (US); Joseph Hassan, Singer Island, FL (US)

(73) Assignee: Nitey Leash, LLC, Mayfield Heights, OH (US)

( * ) Notice: Subject to any disclaimer, the term of this patent is extended or adjusted under 35 U.S.C. 154(b) by 0 days.

(21) Appl. No.: 15/891,656

(22) Filed: Feb. 26, 2018

(51) Int. Cl.
*A01K 27/00* (2006.01)
*F21V 33/00* (2006.01)

(52) U.S. Cl.
CPC .......... *A01K 27/006* (2013.01); *A01K 27/003* (2013.01); *F21V 33/00* (2013.01)

(58) Field of Classification Search
CPC .. A01K 27/006; A01K 27/003; A01K 27/005; A01K 27/008; A01K 27/009; E01H 2001/1266
USPC .......................................... 119/795, 859, 792
See application file for complete search history.

(56) References Cited

U.S. PATENT DOCUMENTS

| 4,513,692 | A | * | 4/1985 | Kuhnsman | ........... | A01K 27/006 119/795 |
| 4,887,552 | A | * | 12/1989 | Hayden | ................ | A01K 27/006 119/793 |
| 5,429,075 | A | | 7/1995 | Passarella et al. | | |
| 5,558,044 | A | | 9/1996 | Nasser, Jr. et al. | | |
| 5,762,029 | A | | 6/1998 | DuBois et al. | | |
| 5,850,807 | A | * | 12/1998 | Keeler | ................. | A01K 27/006 119/799 |
| 5,967,095 | A | * | 10/1999 | Greves | ................. | A01K 27/006 119/792 |
| 6,024,054 | A | | 2/2000 | Matt et al. | | |
| 7,367,285 | B2 | * | 5/2008 | Cooper | ................ | A01K 27/006 119/792 |
| 7,506,615 | B1 | * | 3/2009 | Sansone | ............... | A01K 27/006 119/161 |
| 7,536,980 | B2 | * | 5/2009 | Cooper | ................ | A01K 27/006 119/792 |
| 7,594,482 | B1 | * | 9/2009 | Toplin | .................. | A01K 27/006 119/792 |
| 8,201,964 | B2 | | 6/2012 | Mattheis | | |
| 9,545,084 | B2 | * | 1/2017 | Osher | ................. | A01K 27/006 |
| 9,603,341 | B2 | | 3/2017 | Scaba | | |
| 2006/0162674 | A1 | | 7/2006 | Neiser | | |
| 2011/0120388 | A1 | | 5/2011 | Shahbaz | | |

* cited by examiner

*Primary Examiner* — Yvonne R Abbott-Lewis
(74) *Attorney, Agent, or Firm* — Fay Sharpe LLP; James E. Scarbrough

(57) ABSTRACT

An illuminated animal restraint has an elongated non-retractable leash of a fixed length. The leash has a housing having a first selectively enabled light assembly which has a first light source assembly extending through the leash thereby illuminating a portion of the leash or the entire length of the leash. A second selectable enabled light assembly is also formed in the housing for effectively illuminating an area adjacent the leash for facilitating seeing and picking up animal waste due to the fixed length of the non-retractable leash.

5 Claims, 8 Drawing Sheets

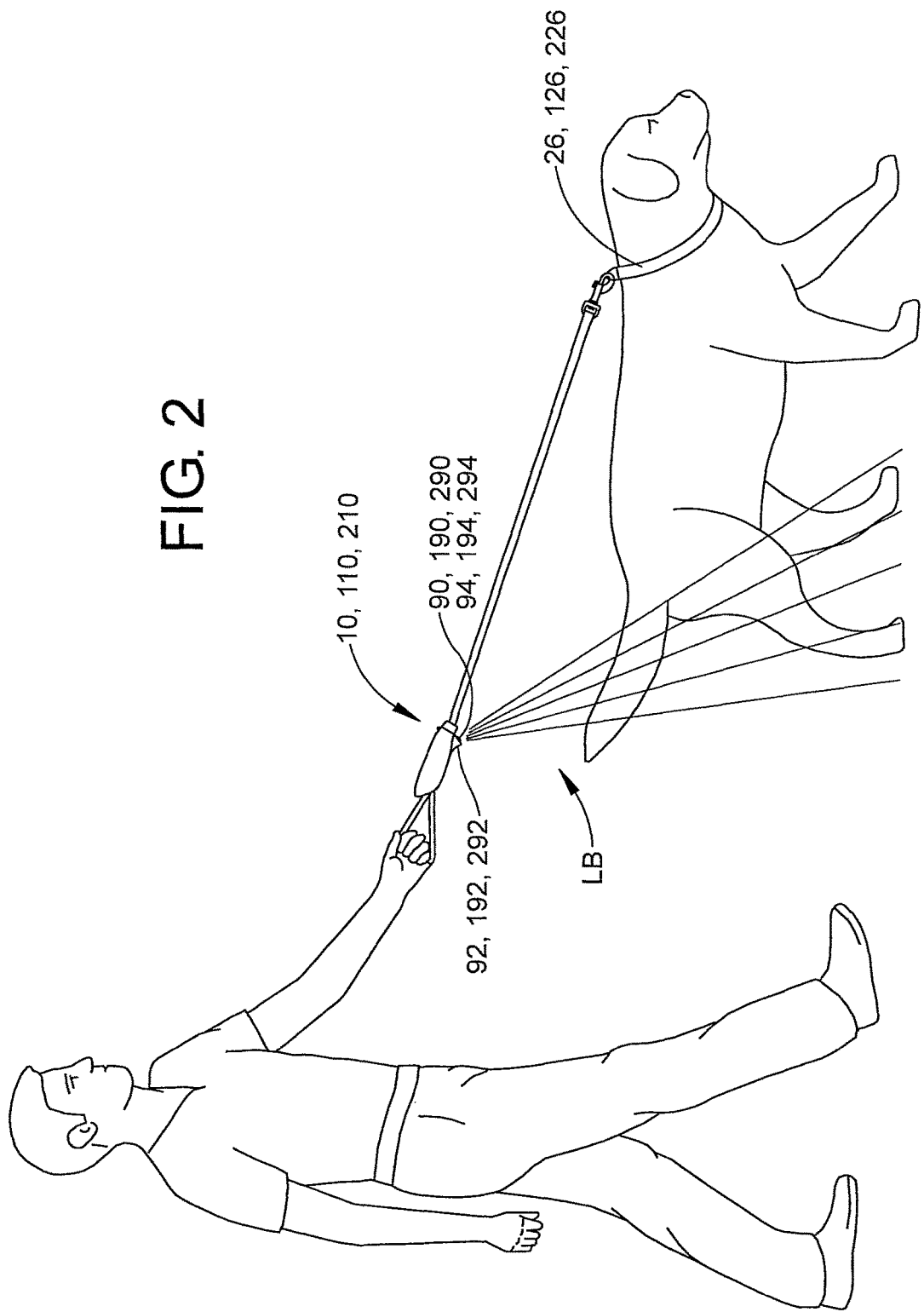

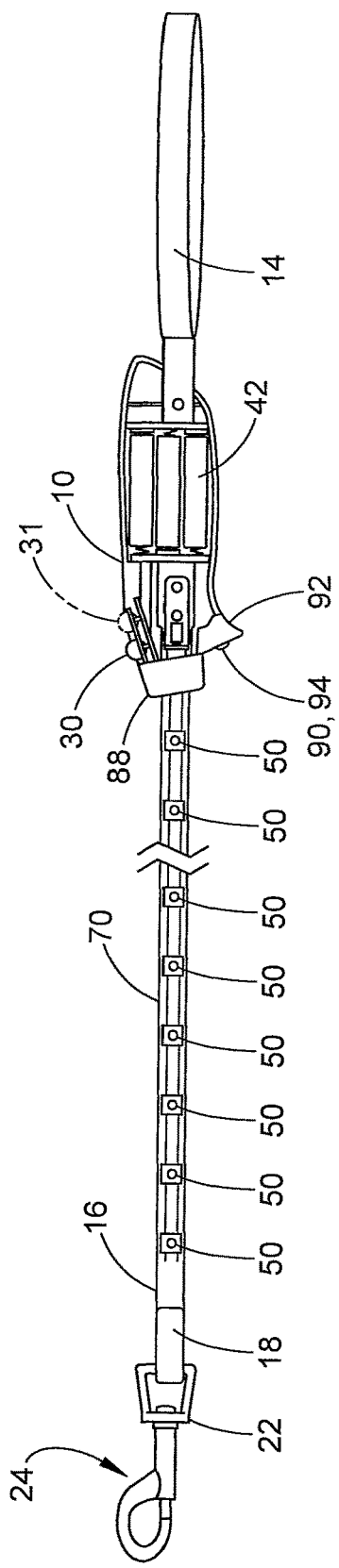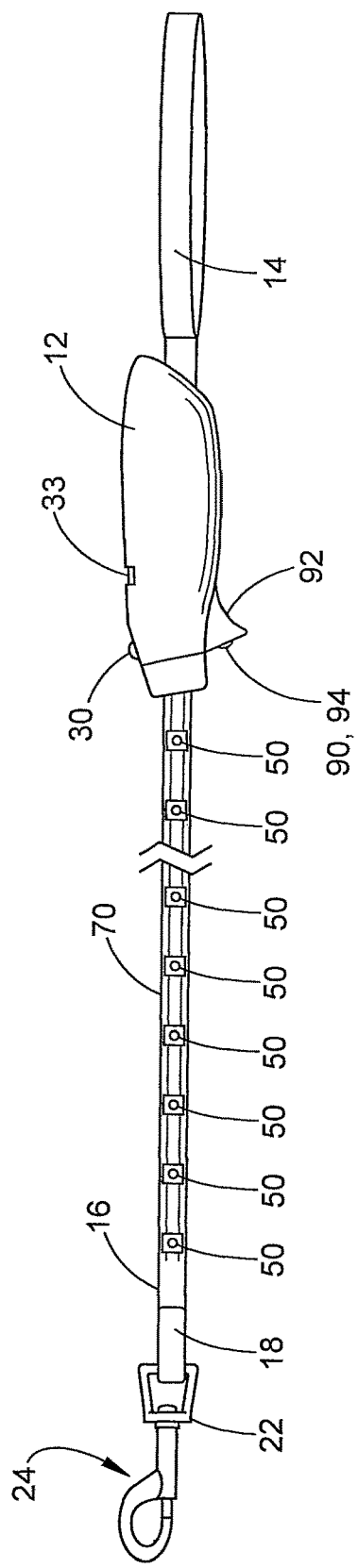

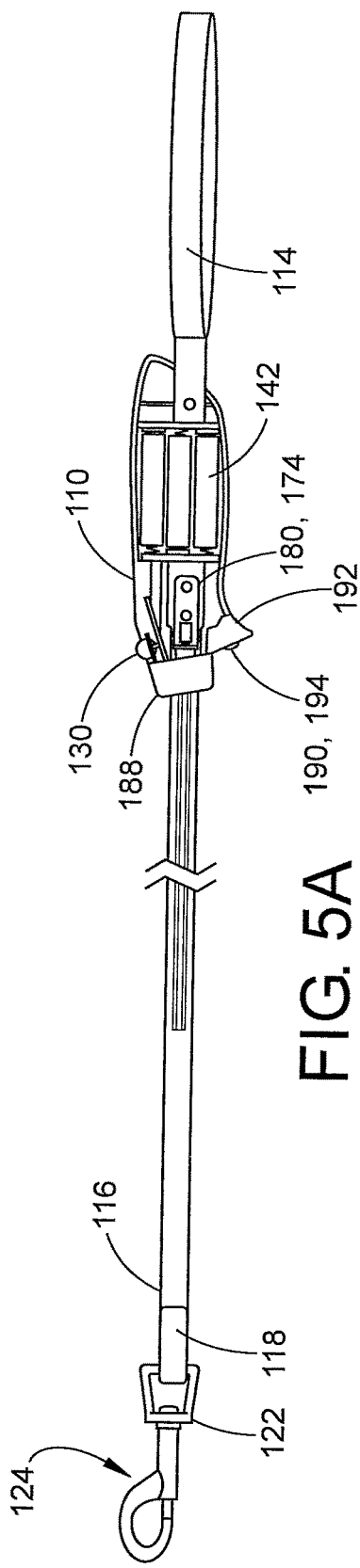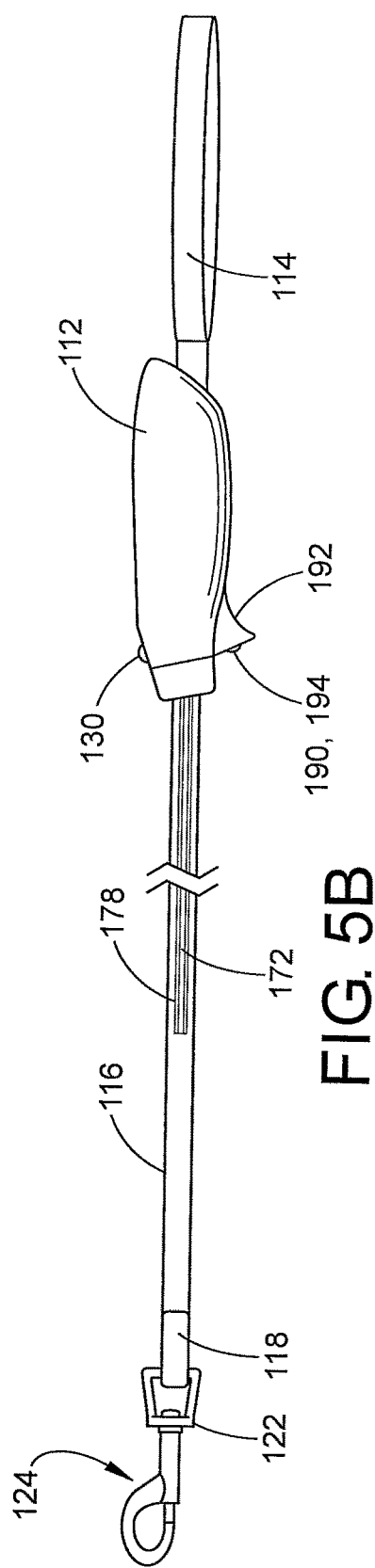

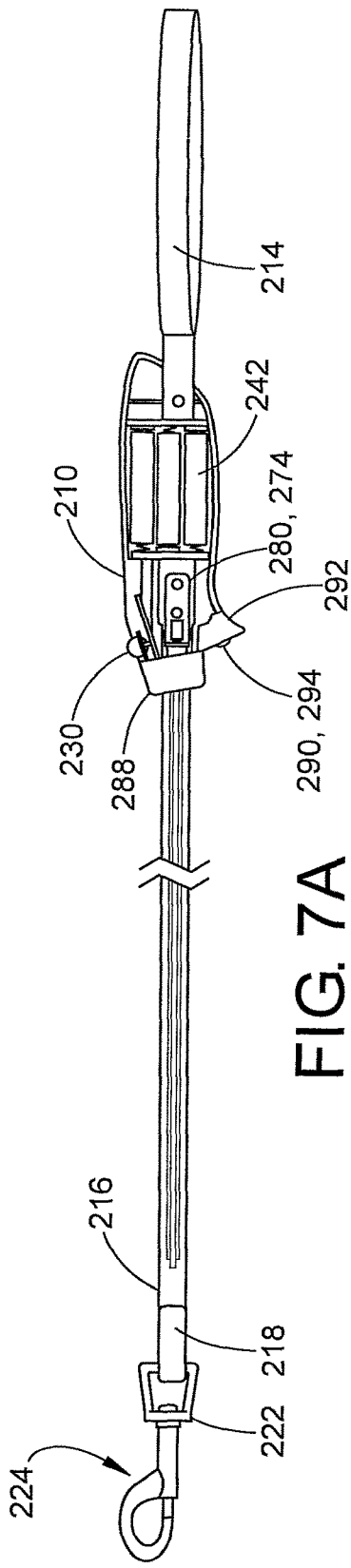
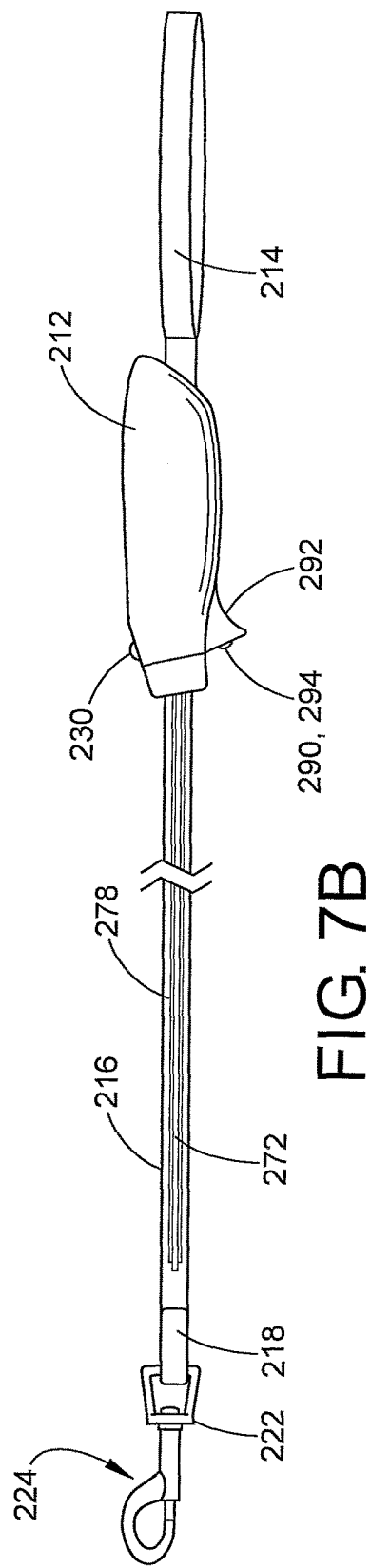
FIG. 7A
FIG. 7B

LIGHTED NON-RETRACTABLE ANIMAL RESTRAINT WITH ADDITIONAL LIGHTING FEATURE

BACKGROUND OF THE DISCLOSURE

The present disclosure relates to animal or pet restraints. More particularly, it relates to a non-retractable leash which is illuminated by light sources especially used for walking a pet or animal during dusk or nighttime hours to increase visibility as well as safety for both the pet and pet owner or walker in dark or dimly lit situations and environments.

Walking a pet at night or at dusk can pose visibility and safety issues for pets and their owners. Being visible to automobiles, bikes, etc. can prevent injury or harm to either the pet or the pet owner or walker. Thus, there is a need for non-retractable leashes and collars which are illuminated. Furthermore, lighted pet leashes add a dimension of style and fun to walking a pet.

Also, there is a need for additional illumination for seeing and picking up animal waste; i.e., poop. Some existing leashes (illuminated or not) provide additional illumination such as by a flashlight but they tend to be only used with retractable leashes. Since they are retractable, these leashes tend to be rather long, i.e., 10 to 15 feet or more. As a result, it is difficult to provide a light beam which effectively illuminates a leash over 10 feet long as well as the ground 10 to 15 feet away from the user holding the leash. The user then has a difficult time seeing the ground and animal waste to be picked up.

Thus, there is a need for providing a non-retractable illuminated leash which has a fixed length (such as about 3 to 8 feet) which has additional illumination which provides a light beam which effectively lights the ground where the animal is walking or pooping. This allows the user to easily see the animal waste for picking up the waste to discard it.

Accordingly, there is a need for an illuminated non-retractable animal leash which provides illumination and provides additional lighting for effectively lighting the area adjacent the leash for picking up animal waste which overcomes the above-mentioned deficiencies and others while providing better overall results.

SUMMARY OF THE DISCLOSURE

The present disclosure relates to animal or pet restraints. More particularly, it relates to a pet or animal non-retractable leash which is illuminated along a portion of the leash or the entire length of the leash by a lighting assembly using light sources and light transmitting members especially used for walking a pet or animal at dusk, at night, at dawn or early morning.

One embodiment of the disclosure is a non-retractable animal restraint or leash which has a lighting feature which effectively illuminates at least a portion of the leash.

Another embodiment of the disclosure is a non-retractable leash which has a lighting feature which illuminates an entire length of the leash.

Another embodiment of the disclosure is an additional lighting feature to illuminate the areas near the non-retractable leash so the user can see and pick up animal waste from their pet.

Another embodiment of the disclosure is a non-retractable leash with a fixed length such as 3 to 8 feet which provides the optimum length for effectively lighting the area near the leash with the additional lighting.

Another embodiment of the disclosure is the additional light is comprised of a flashlight or LED integrated into the leash handle.

Another embodiment of the disclosure is the light illuminating the leash can be LEDs, fiber optics or a combination of LEDs and fiber optics.

Another embodiment of the disclosure is the light illuminating the leash and the additional light can be lit simultaneously or independently.

In accordance with another embodiment of the disclosure, an illuminated non-retractable animal restraint includes an elongated non-retractable leash having a fixed length. The leash has a housing having a first selectively enabled light assembly. The first selectively enabled light assembly extends through the leash thereby illuminating the leash. A second selectable enabled light assembly is formed in the housing for illuminating an area adjacent the leash. The second selectably enabled light source includes a second light source.

In accordance with one embodiment of the disclosure, an illuminated non-retractable animal restraint has an elongated non-retractable leash having a first end includes a handle and a second end, wherein the handle has a first light source, a second light source and a switch for selectively operating the first and second light source. The leash includes a light transmitting member operationally connected to the first light source, wherein the light transmitting member extends through a body of the leash thereby illuminating the leash; and wherein the second light source is positioned within a protrusion of the handle, the second light source projects light into an area adjacent the leash.

In accordance with another embodiment of the disclosure, a method for illuminating an animal restraint and an area adjacent said leash includes the steps of providing an elongated non-retractable leash having a first end having a handle and a second end; providing a first light source within the handle and a switch for selectively operating the first light source; providing a light transmitting member connected to the first light source, wherein the light transmitting member extends through the leash thereby illuminating the leash; providing a second light source within the handle and the switch selectively operates the second light source for illuminating an area adjacent the leash to facilitate seeing and picking up animal waste.

Still other aspects of the disclosure will become apparent upon a reading and understanding of the following detailed description.

BRIEF DESCRIPTION OF THE DRAWINGS

FIG. 2 is a side elevational view showing a user and the animal restraint of FIG. 1 being used with a pet.

FIG. 3A is a side elevational view of a rope and handle bottom of the restraint in accordance with a first embodiment of the disclosure.

FIG. 3B is a side elevational view of a rope and handle top of the restraint in accordance with a first embodiment of the disclosure.

FIG. 5A is a side elevated view of a rope and handle bottom of the restraint in accordance with a second embodiment of the disclosure.

FIG. 5B is a side elevated view of a rope and handle top of the restraint in accordance with a second embodiment of the disclosure.

FIG. 7A is a side elevated view of a rope and handle bottom of the restraint in accordance with a third embodiment of the disclosure.

FIG. 7B is a side elevated view of a rope and handle top of the restraint in accordance with a third embodiment of the disclosure.

DETAILED DESCRIPTION OF THE DISCLOSURE

A problem with existing leashes is they provide an additional light, such as a flashlight, with a retractable leash which has a non-optimal length of 10 feet to 15 feet or more. As a result, the flashlight cannot effectively provides a light beam to illuminate the area near the leash since it is 10 to 15 feet away or more. It is thus preferable to provide an additional light with a non-retractable leash of a fixed, shorter length.

There are many options for providing illumination to a non-retractable leash and a second light for effectively lighting an area near the leash. For example, LEDs may be used alone or in combination with fiber optics to illuminate a portion of the leash or the entire length of the leash. Other embodiments contemplated by the disclosure include light bulbs, flashlights, or any other suitable light sources. The leash also has a secondary light source, which can be as an LED, light bulb, flashlight or any suitable light source for illuminating the area adjacent the leash.

With reference now to FIGS. 1-4, a first embodiment of a lighted animal or pet restraint in the form of a leash is shown and described. The Figures illustrate a first embodiment of the disclosure only and the disclosure is not limited to the embodiments of the Figures. The restraint may also include a collar in addition to a leash. In this embodiment, LEDs are used to illuminate the entire length of the leash.

Figure 1:
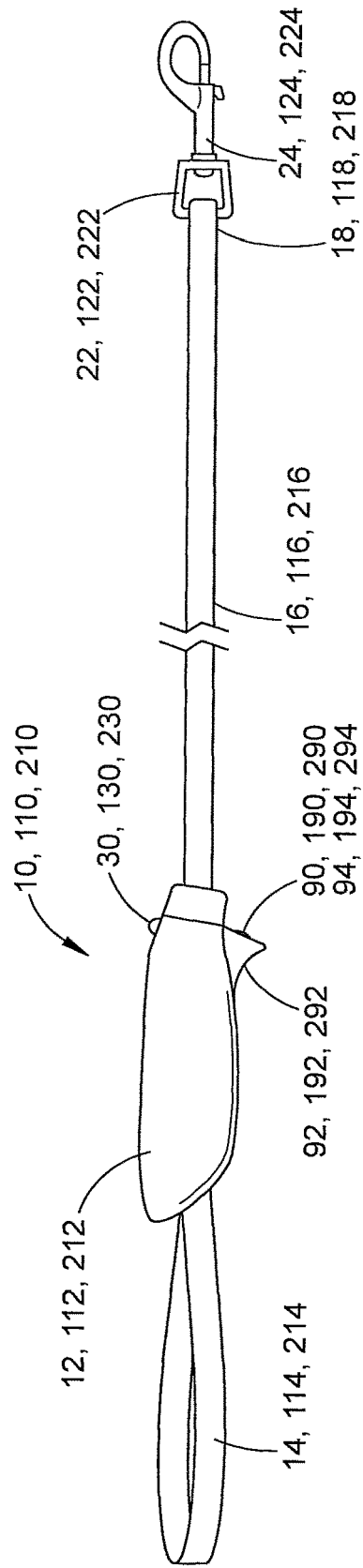
FIG. 1 is a side elevational view of the animal restraint in accordance with a preferred embodiment of the disclosure.

Referring now to FIGS. 1 and 2, the physical embodiments of the restraint preferably include a leash 10 having a handle 12, a handle strap 14 connected to and extending from the handle and a lead or rope 16 extending from the handle. At an opposite end of the rope is a loop 18 for holding ring 22 of a metal lock hook 24 for attaching the leash to a collar 26 (see FIG. 2).

The leash is non-retractable and has a fixed length preferably around three (3) to eight (8) feet long, but other lengths are contemplated by the disclosure. For example, the length of the rope can be any desired length, such as, three, four, five, six or more feet.

The rope is also preferably water resistant for rainy day use. The rope can be made of any suitable material such as polypropylene (PP), nylon, vinyl, etc. and the lighting feature may also be interwoven into the rope along the length of the leash.

The handle strap 14 can be made of the same or different material as the rope 16. For instance, in some embodiments the handle strap can be leather or an imitation leather material such as vinyl. The handle strap and handle can cooperate to secure the leash in a hand of a user such as a pet walker.

With reference still to FIG. 1, it can be seen that the handle embodiment has an ergonomically designed shape so that a user can easily hold it and operate the illuminating function with only one hand by depressing activating button 30. The handle 12 preferably can have a textured surface to prevent slipping off of the hand of a user.

Figure 4:
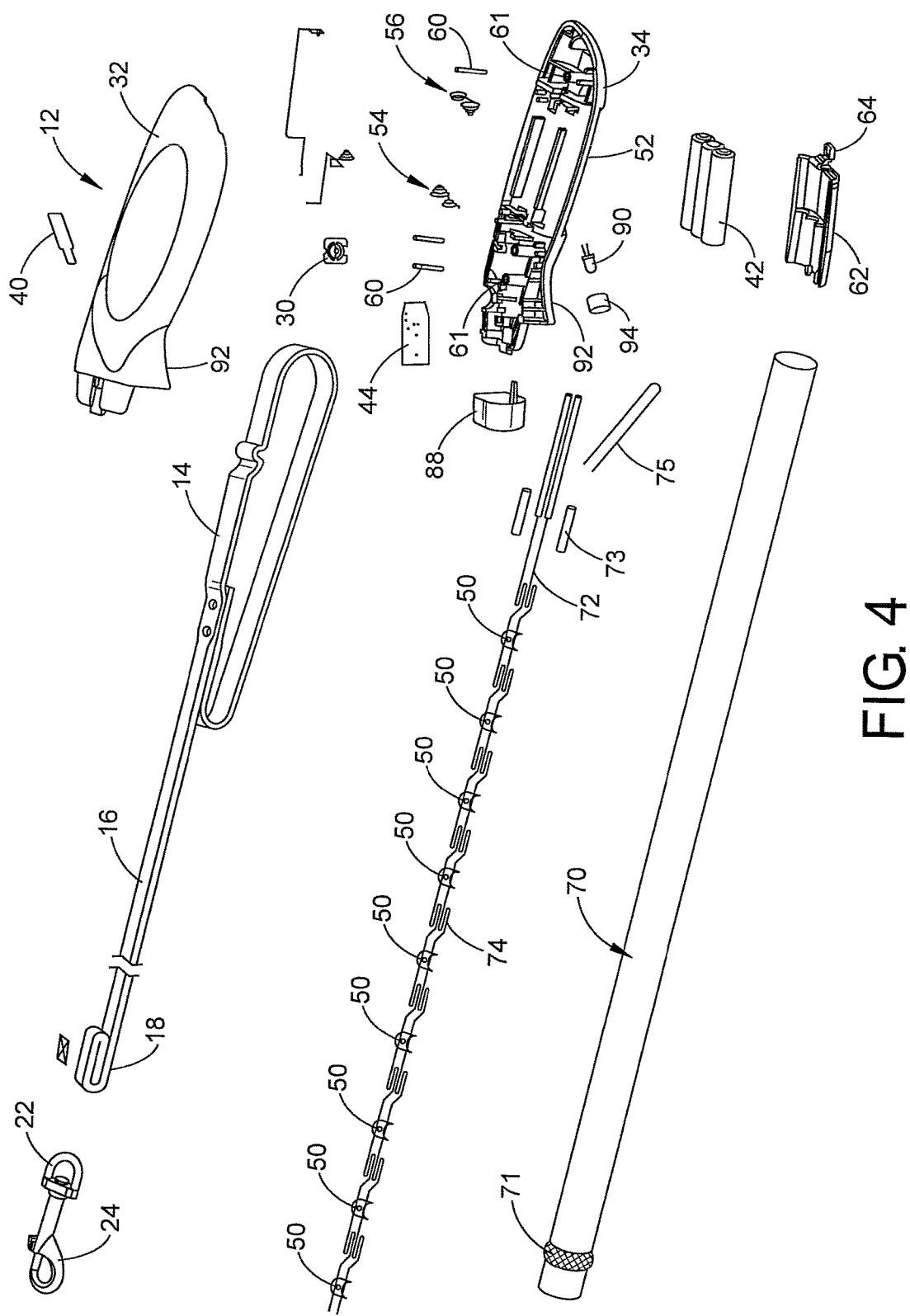
FIG. 4 is an exploded perspective view of the illuminated animal restraint in accordance with a first embodiment of the disclosure.

Referring now to FIG. 4, the handle can be made of two rigid plastic halves 32, 34 secured together, such as in a clam shell design, or it can be made of flexible material. As an alternative, the handle itself can be a strap loop made of the same material as the leash itself, such as nylon or polypropylene rope. This will allow the handle to be softer, more pliable and more comfortable. Loop or strap 14 around the handle 12 additionally secures the handle to the hand of a user in the manner of a conventional animal leash. The loops help ensure a secure, comfortable grip.

From an electrical or electronic standpoint, the restraint includes provisions for a power source (e.g., a battery), a control switch, and a light source drive and a light transmitting member.

Referring specifically now to FIGS. 3A-3B, the handle includes activating button or control switch 30 and other electrical or electronic components. For example, a slot may be provided in the handle for receiving an insulator tab 40 (FIG. 4) for separating contacts of an enabling sensor. As an alternative, a USB rechargeable interface could also be provided. Switch 30 can include a single switch or can include switch 30 and an optional second switch 31 (see FIG. 3A), which would provide the option of the light source for the leash and the additional light to be powered independently of each other. An optional second switch such as switch 31 can also be provided for the other embodiments in this disclosure.

Provisions for a power source (batteries 42), and a light source and light source drive can also be housed internally within the handle. A printed circuit board assembly (PCBA) 44 controls operation of light sources such as, but not limited to Light Emitting Diodes (LEDs) 50.

Referring now to FIG. 4, the power source provision can include a chamber 52 and electrical contacts 54, 56 for receiving batteries such as three AAA batteries 42. Other batteries such as C and/or D batteries could also be used in some embodiments. Other embodiments could allow for solar cell recharging of an energy storage device such as a battery or capacitor. Another embodiment would provide for a USB rechargeable port such as port 33 (See FIG. 3B).

The batteries and battery chamber can be housed within handle assembly 12 including top member 32 and bottom member 34 both preferably formed of plastic. Several pins 60 are positioned within openings 61 to both align and secure the top and bottom portions 32, 34 of the handle together. A battery cover 62 snaps over the handle bottom via restraint clip 64 to secure the batteries in place.

A problem with existing leashes is they provide an additional light, such as a flashlight, with a retractable leash which has a non-optimal length of 10 feet to 15 feet or more which cannot be effectively illuminated by the flashlight. It is preferable to provide an additional light with a non-retractable leash.

Thus, in accordance with a preferred embodiment of the disclosure, and referring to FIGS. 3A-3B and 4, the light assembly of the present disclosure preferably includes a light source including a series of Light Emitting Diodes (LEDs) 50 including a printed circuit board assembly such as, for example, white, blue, red, green, pink, yellow, amber, orange, or any other desired color, or infrared light emitting diode. The LEDs 50 are coupled via wires 72, which in turn are operating coupled to the power source 42 and switch 50. A heat shrink 73 is positioned at the end of wires 70.

With particular reference to FIGS. 3A and 3B, it can been seen that leash 10 includes a plurality of lights (LEDs) 50 housed within a flexible clear housing or tube 70, such as a polyvinyl chloride (PVC) tube that are connected via a wire arrangement 72, such as copper wire, that helps prevent breakage of the lighting wire system. Additionally a spring 71 such as a helical coil spring can be positioned inside the tube near the handle to protect the wires and absorb and reduce the force exerted on the wiring in the leash from side to side pull forces from an animal, such as a dog, running or moving in a sideways or back and forth motion.

Folds 74 such as substantially "Z" shaped folds in the wires 72 in between the LEDs 50 as shown allows the wire to effectively stretch with a spring-like operation at the folds when the folds are unfolded during a pull or when the leash is extended during occasional animal pulling thereon. Other fold shapes are also contemplated by the disclosure. Rope 75 can be interwoven over the tube 70.

As a result of the LEDs, the leash is completely illuminated from end to end and is also illuminated on all sides, that is, in particular the front of the leash facing away from the user and the rear of the leash facing the user. The lighting also effectively illuminates the leash during the daytime. An alternate embodiment would include the LEDs 50 extending only partially along the length of the leash, thus illuminating a portion of the leash only.

The LED or light assembly wire 72 is positioned within the handle adjacent an end cap 88 on an outer end of the handle. The PVC tube 70 and LEDs 50 are positioned within the leash rope 16 which extends through the handle and forms a loop or strap 14 for extending over the hand and wrist of the user.

Referring still to FIG. 4, an additional light 90 is mounted within the handle housing assembly. Light 90 is used to provide a light beam to see animal waste on the ground to be picked up. Light 90, such as a flashlight, is enclosed within a protrusion 92 formed as part of handle housing portions 32, 34. As an alternative, the light assembly 90, 92 may be movable or adjustable on the handle or leash. The light can be any suitable light, such as an LED, for projecting a beam of light LB (see FIG. 2) onto the ground adjacent the leash. A protective lens 94 is placed over the light 90. The light 90 may be operated independently of the light 50 for the leash, or they may illuminate at the same time. Batteries 42 or circuit board 44 also power the LED 90. The light 90, since it is being used with a non-retractable leash of an optimal fixed length such as 3 to 8 feet, provides a light beam LB which can effectively illuminate the area or ground near the leash and the animal. This allows the user to clearly see the areas in particular for picking up animal waste (poop) on the ground. FIG. 2 illustrates the light 90 being used while walking a pet, but this will not always necessarily be the case. The circuit board 44 may be programmed so that the leash light 50 may be shut off and only light 90 is illuminated to better highlight the animal waste.

In accordance with a second embodiment of the disclosure, and referring to FIGS. 1, 2, 5A-5B and 6, the light assembly includes LEDs and fiber optics which illuminate a portion of the leash. Referring now to FIGS. 1 and 2, the physical embodiments of the restraint preferably include a leash 110 having a handle 112, a handle strap 114 connected to and extending from the handle and a lead or rope 116 extending from the handle. At an opposite end of the rope is a loop 118 for holding ring 122 of a metal lock hook 124 for attaching the leash to a collar 126 (see FIG. 2). The leash is non-retractable and has a fixed length preferably around three (3) to eight (8) feet long, but other lengths are contemplated by the disclosure. For example, the length of the rope can be any desired length, such as, three, four, five, six or more feet.

In this embodiment, the light assembly preferably includes a wireless light source. One example is a light emitting diode (LED) 150 including a printed circuit board assembly such as, for example, white, blue, red, green, pink, yellow, amber, orange, or any other desired color, or infrared light emitting diode. Other suitable light sources are also contemplated by the disclosure.

The light from the light source is preferably distributed through a light transmitting member 172. The light source is operationally connected to the light transmitting member without the use of any wires. For example, the light source has a holding plate 174 such as a plastic plate which holds the light (e.g., LED) adjacent or near the light transmitting member 172. The assembly of the plate 174 and member 172 can be coupled wrapped together using tape 176 connected to an end of transmitting member 172.

The light transmitting member 172 can be, but is not limited to, fiber optic material, PU (polyurethane), or any light suitable conducting materials. The light transmitting material 172, if it is fiber optics, has a heat shrink 173 at one end and is formed by a fiber optic chemical liquid converted into a solid through a heating and cooling process and which is held by Teflon cladding or any suitable plastic material such as polyvinyl chloride (PVC), etc. The light transmitting member 172, in turn, extends partially through a clear tube 178, such as a PVC tube, which extends along a portion of the leash. The tube 178 can be flexible and also helps form the shape of the leash by surrounding the tube with the rope 116. Alternatively, lighting material 172 is interwoven directly with the rope.

The LED light source 150 is secured onto an LED holding plate 174 which has an upper portion 180 and a lower portion 182. A Polyethylene Teraphtholate (PET) film 184 is positioned over or around the LED.

The LED or light assembly is positioned within the handle adjacent a bushing 186 and an end cap 188 on an outer end of the handle. The fiber optic and PVC tubes are positioned within the leash rope 116 which extends through the handle and forms a loop or strap 114 for extending over the hand and wrist of the user.

Figure 6:
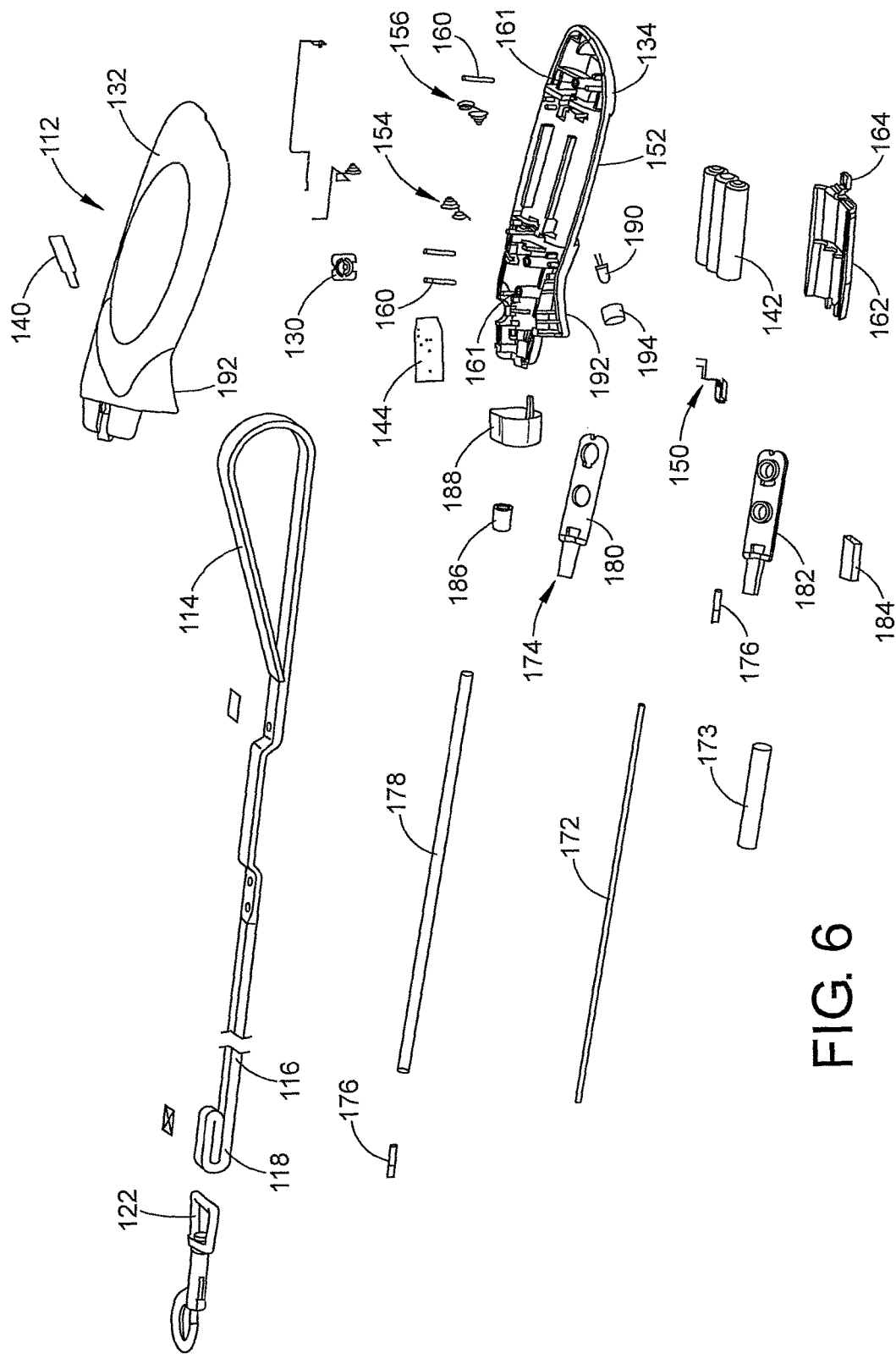
FIG. 6 is an exploded perspective view of the illuminated animal restraint in accordance with a second embodiment of the disclosure.

Referring still to FIG. 6, an additional light 190 is mounted within the handle housing assembly. Light 190, such as a flashlight, is enclosed within a protrusion 192 formed as part of handle housing portions 132, 134. The light can be any suitable light, such as an LED, for projecting a beam of light LB (see FIG. 2) onto the ground adjacent the leash. A protective lens 194 is placed over the light 190. The light 190 may be operated independently of the light 150 for the leash, or they may illuminate at the same time. Batteries 142 or circuit board 144 also power the LED 190. The light 190, since it is being used with a non-retractable leash of an optimal fixed length such as 3 to 8 feet, provides a light beam LB which can effectively illuminate the area or ground near the leash and the animal. This allows the user to clearly see the areas in particular for picking up animal waste (poop) on the ground.

Referring now to FIG. 6, the handle can be made of two rigid plastic halves 132, 134 secured together, such as in a clam shell design, or it can be made of flexible material. As an alternative, the handle itself can be a strap loop made of the same material as the leash itself, such as nylon or polypropylene rope. This will allow the handle to be softer, more pliable and more comfortable. Loop or strap 114 around the handle 112 additionally secures the handle to the hand of a user in the manner of a conventional animal leash. The loops help ensure a secure, comfortable grip.

From an electrical or electronic standpoint, the restraint includes provisions for a power source (e.g., a battery), a control switch, and a light source drive and a light transmitting member.

Referring specifically now to FIGS. 5A-5B, the handle includes activating button or control switch 130 and other electrical or electronic components. For example, a slot may be provided in the handle for receiving an insulator tab 140 (FIG. 6) for separating contacts of an enabling sensor. As an alternative, a USB rechargeable interface could also be provided.

Provisions for a power source (batteries 142), and a light source and light source drive can also be housed internally within the handle. A printed circuit board assembly (PCBA) 144 controls operation of light sources such as, but not limited to Light Emitting Diodes (LEDs) 150.

Referring now to FIG. 6, the power source provision can include a chamber 152 and electrical contacts 154, 156 for receiving batteries such as three AAA batteries 142. Other batteries such as C and/or D batteries could also be used in some embodiments. Other embodiments could allow for solar cell recharging of an energy storage device such as a battery or capacitor. Another embodiment would provide a USB rechargeable part.

The batteries and battery chamber can be housed within handle assembly 112 including top member 132 and bottom member 134 both preferably formed of plastic. Several pins 160 are positioned within openings 161 to both align and secure the top and bottom portions 132, 134 of the handle together. A battery cover 162 snaps over the handle bottom via restraint clip 164 to secure the batteries in place.

In accordance with a third embodiment of the disclosure, and referring to FIGS. 1, 2, 7A-7B and 8, the light assembly includes an LED and fiber optics which illuminates the entire length of the leash. Referring now to FIGS. 1 and 2, the physical embodiments of the restraint preferably include a leash 210 having a handle 212, a handle strap 214 connected to and extending from the handle and a lead or rope 216 extending from the handle. At an opposite end of the rope is a loop 218 for holding ring 222 of a metal lock hook 224 for attaching the leash to a collar 26 (see FIG. 2). The leash is non-retractable and has a fixed length preferably around three (3) to eight (8) feet long, but other lengths are contemplated by the disclosure. For example, the length of the rope can be any desired length, such as, three, four, five, six or more feet.

In this embodiment, the light assembly preferably includes a wireless light source such as a light emitting diode (LEDs) 250 including a printed circuit board assembly such as, for example, white, blue, red, green, pink, yellow, amber, orange, or any other desired color, or infrared light emitting diode. Other suitable light sources are also contemplated by the disclosure.

The light from the light source is preferably distributed through a light transmitting member 272. The light source is operationally connected to the light transmitting member without the use of any wires. For example, the light source has a holding plate 274 such as a plastic plate which holds the light (e.g., LED) adjacent or near the light transmitting member 272. The assembly of the plate 274 and member 272 can be coupled wrapped together using tape 276 connected to an end of transmitting member 272.

The light transmitting member can be, but is not limited to, fiber optic material, PU (polyurethane), or any light suitable conducting materials. The light transmitting material 272, if it is fiber optics, has a heat shrink 273 at one end and is formed by a fiber optic chemical liquid converted into a solid through a heating and cooling process and which is held by Teflon cladding or any suitable plastic material such as polyvinyl chloride (PVC), etc. The light transmitting member 272, in turn, extends through a clear tube 278, such as a PVC tube, which extends along the entire length of the leash. The tube 278 also helps form the shape of the leash by surrounding the tube with the rope 216. Alternatively, lighting material 272 is interwoven directly with the rope.

As a result, the leash is completely illuminated from end to end and is also illuminated on all sides, that is, in particular the front of the leash facing away from the user and the rear of the leash facing the user. The lighting also effectively illuminates the leash during the daytime.

The LED light source 250 is secured onto an LED holding plate 274 which has an upper portion 280 and a lower portion 282. A Polyethylene Teraphtholate (PET) film 284 is positioned over or around the LED.

The LED or light assembly is positioned within the handle adjacent a bushing 286 and an end cap 288 on an outer end of the handle. The fiber optic and PVC tubes are positioned within the leash rope 216 which extends through the handle and forms a loop or strap 214 for extending over the hand and wrist of the user.

Figure 8:
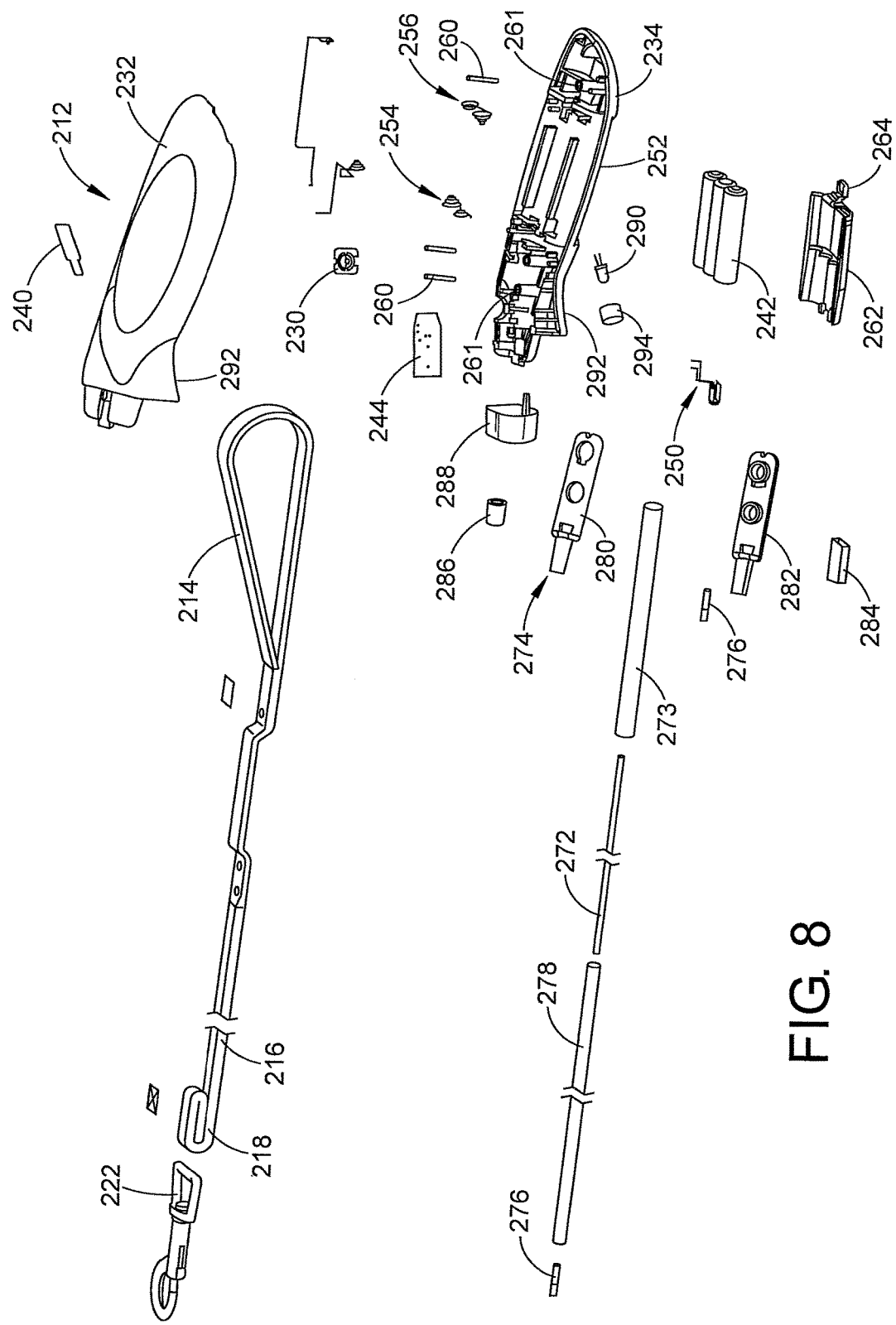
FIG. 8 is an exploded perspective view of the illuminated animal restraint in accordance with a third embodiment of the disclosure.

Referring still to FIG. 8, an additional light 290 is mounted within the handle housing assembly. Light 290, such as a flashlight, is enclosed within a protrusion 292 formed as part of handle housing portions 232, 234. The light can be any suitable light, such as an LED, for projecting a beam of light LB (see FIG. 2) onto the ground adjacent the leash. A protective lens 294 is placed over the light 290. The light 290 may be operated independently of the light 250 for the leash, or they may illuminate at the same time. Batteries 242 or circuit board 244 also power the LED 290. The light 290, since it is being used with a non-retractable leash of an optimal fixed length such as 3 to 8 feet, provides a light beam LB which can effectively illuminate the area or ground near the leash and the animal. This allows the user to clearly see the areas in particular for picking up animal waste (poop) on the ground.

Referring now to FIG. 8, the handle can be made of two rigid plastic halves 232, 234 secured together, such as in a clam shell design, or it can be made of flexible material. As an alternative, the handle itself can be a strap loop made of the same material as the leash itself, such as nylon or polypropylene rope. This will allow the handle to be softer, more pliable and more comfortable. Loop or strap 214 around the handle 212 additionally secures the handle to the hand of a user in the manner of a conventional animal leash. The loops help ensure a secure, comfortable grip.

From an electrical or electronic standpoint, the restraint includes provisions for a power source (e.g., a battery), a control switch, and a light source drive and a light transmitting member.

Referring specifically now to FIGS. 7A-7B, the handle includes activating button or control switch 230 and other electrical or electronic components. For example, a slot may be provided in the handle for receiving an insulator tab 240 (FIG. 8) for separating contacts of an enabling sensor. As an alternative, a USB rechargeable interface could also be provided.

Provisions for a power source (batteries 242), and a light source and light source drive can also be housed internally within the handle. A printed circuit board assembly (PCBA) 244 controls operation of light sources such as, but not limited to Light Emitting Diodes (LEDs) 250.

Referring now to FIG. 8, the power source provision can include a chamber 252 and electrical contacts 254, 256 for receiving batteries such as three AAA batteries 242. Other batteries such as C and/or D batteries could also be used in some embodiments. Other embodiments could allow for solar cell recharging of an energy storage device such as a battery or capacitor.

The batteries and battery chamber can be housed within handle assembly 212 including top member 232 and bottom member 234 both preferably formed of plastic. Several pins 260 are positioned within openings 261 to both align and secure the top and bottom portions 232, 234 of the handle together. A battery cover 262 snaps over the handle bottom via restraint clip 264 to secure the batteries in place.

According to one aspect of the disclosure, the animal restraint is non-retractable.

According to another aspect of the disclosure, the animal restraint or leash has a fixed length of preferably about 3 to 8 feet.

According to another aspect of the restraint is partially illuminated from end to end.

According to one aspect of the disclosure, the restraint is completely illuminated from end to end to facilitate safe evening walks with pets.

According to another aspect of the disclosure, the animal restraint is lighted using a light source and a light transmitting member such as LEDs, fiber optics, a combination of both, or any suitable light source.

According to another aspect of the disclosure, a second light is provided to provide a beam of light adjacent the leash to enable effectively the user to see and pick up animal waste since the leash has a fixed length of only 3 to 8 feet long or so.

According to another embodiment of the disclosure, the second light can be LEDs, a light bulb, a flashlight, or any suitable light source.

According to another aspect of the disclosure, one of more switches can be provided so that the light for illuminating the leash and the additional leash can be lit independently or at the same time.

According to another aspect of the disclosure, the lights can be powered by batteries or via a USB port interface.

The embodiments described above are illustrative only. Various other embodiments are encompassed or contemplated by the disclosure and the appended claims.

What is claimed is:

1. An illuminated non-retractable animal restraint, comprising:
    an elongated non-retractable leash having a first end comprising a handle and a second end, wherein said handle comprises a first light source, a second light source and one or more switches for selectively operating said first and second light source;
    wherein said leash comprises a light transmitting member operationally connected to said first light source, wherein said light transmitting member extends through a body of said leash thereby illuminating the leash;
    and wherein said second light source is positioned within a protrusion of said handle, said second light source projects light into an area adjacent said leash.

2. The illuminated non-retractable animal restraint of claim 1, wherein said first and second light sources each comprise a Light Emitting Diode.

3. The illuminated non-retractable animal restraint of claim 1, wherein said light transmitting member comprises fiber optics which are housed within a tube extending through the leash.

4. The illuminated non-retractable animal restraint of claim 1, wherein said leash has a fixed length of between about 3 feet to about 8 feet long.

5. The illuminated animal restraint of claim 4, wherein said second light source provides a beam of light to effectively illuminate an area adjacent said leash to facilitate finding and disposing of animal waste.

* * * * *